United States Patent [19]
Adachi

[11] Patent Number: 4,750,600
[45] Date of Patent: Jun. 14, 1988

[54] CLUTCH COVER

[75] Inventor: Naomichi Adachi, Aichi, Japan

[73] Assignee: Aisin Seiki Kabushiki Kaisha, Kariya, Japan

[21] Appl. No.: 831,320

[22] Filed: Feb. 20, 1986

[30] Foreign Application Priority Data

Feb. 21, 1985 [JP] Japan .................. 60-024240[U]

[51] Int. Cl.$^4$ .................................. F16D 13/18
[52] U.S. Cl. .................. 192/70.18; 192/109 R; 192/70.13
[58] Field of Search ............. 192/70.18, 70.25, 70.27, 192/70.28, 89 B, 109 R, 109 A, 109 B, 70.13

[56] References Cited

U.S. PATENT DOCUMENTS

| | | | |
|---|---|---|---|
| 2,085,167 | 6/1937 | Nutt | 192/107 C |
| 2,253,344 | 8/1941 | Nutt et al. | 192/70.18 |
| 2,359,184 | 9/1944 | Wolfram | 192/70.27 |
| 3,130,828 | 4/1964 | Maurice | 192/66 |
| 3,198,294 | 8/1965 | Stacy | 188/234 |
| 3,250,356 | 5/1966 | Zeidler | 192/70.26 |
| 3,702,651 | 11/1972 | Fujita et al. | 192/70.25 |
| 3,712,435 | 1/1973 | Kraus | 192/70.27 |
| 3,773,155 | 11/1973 | Fujita et al. | 192/70.25 |
| 4,114,740 | 9/1978 | Sugiura et al. | 192/70.18 |
| 4,231,456 | 11/1980 | Nakane et al. | 192/70.25 |
| 4,317,435 | 3/1982 | Kohlhage | 123/179 J |
| 4,471,860 | 9/1984 | Yamada | 192/51 |
| 4,558,771 | 12/1985 | Despres | 192/70.28 X |
| 4,560,055 | 12/1985 | Billet | 192/109 R |
| 4,577,740 | 3/1986 | Carmillet | 192/70.18 |
| 4,640,400 | 2/1987 | Nakane | 192/70.25 |

FOREIGN PATENT DOCUMENTS

| | | | |
|---|---|---|---|
| 2808019 | 8/1979 | Fed. Rep. of Germany | 192/89 B |
| 867268 | 10/1941 | France | 192/109 R |
| 1529779 | 6/1968 | France . | |
| 51-27396 | 7/1976 | Japan . | |
| 35820 | 4/1981 | Japan | 192/109 B |
| 947408 | 1/1964 | United Kingdom . | |

Primary Examiner—John E. Murtagh
Assistant Examiner—Andrew Joseph Rudy
Attorney, Agent, or Firm—Burns, Doane, Swecker & Mathis

[57] ABSTRACT

A clutch cover includes a pressure plate enclosed by a cover core and a strap having one end securely fastened to the cover core by a first rivet and an opposite end securely fastened to the pressure plate by a second rivet. A rivet hole in the one end of the strap for receiving the first rivet and a rivet hole in the other end for receiving the second rivet have the same diameter. The cover core is provided with a first rivet hole for receiving the first rivet and with a caulking tool access hole at a position corresponding to the second rivet, the first rivet hole and the caulking tool access hole being of equal diameter, which is greater than the diameter of the rivet holes in the strap. The strap can thus be fastened to the cover core at a rivet hole which is on the positive side with respect to the direction of engine rotation, and the connection between the strap and the pressure plate can be positioned at a caulking tool access hole which is on the negative side with respect to the direction of engine rotation.

9 Claims, 3 Drawing Sheets

CLUTCH COVER

BACKGROUND OF THE INVENTION

This invention relates to improvements in a clutch cover for use generally in the power transmission system of an automotive vehicle.

A clutch cover generally comprises a cover core, a pressure plate enclosed by the cover core, a diaphragm spring for urging the pressure plate, and a strap having one end securely fastened to the cover core by a rivet and another end securely fastened to the pressure plate by a rivet. The connection between the strap and pressure plate and the connection between the strap and cover core are located at positions decided by the direction of engine rotation. Specifically, in order to establish agreement between the direction in which the cover core pulls the pressure plate and the direction in which the engine rotates, the strap is fastened such that the connection between the strap and the cover core is located on the positive side with respect to the direction of engine rotation and such that the connection between the strap and the pressure plate is located on the negative side.

SUMMARY OF THE DISCLOSURE

A disadvantage has been recognized by the applicant in the prior-art clutch cover described above. Specifically, the strap is formed by pressing work to include rivet holes of identical diameter in each of its two ends. If the holes are of different diameter, it would be necessary to take into account which end is for connection to the cover core and which end is for the pressure plate at the time the strap is installed, and this would entail extra labor. When the rivet holes in the two ends of the strap are of the same diameter, no particular problem is encountered where the rivet hole provided in the cover core and the rivet hole in one end of the strap have the same diameter. However, when the strap is riveted to the pressure plate, a tool for caulking the rivet is passed through the cover core, so that it is necessary to provide the cover core with a caulking tool access hole larger than the rivet hole at a position corresponding to the pressure plate rivet. Accordingly, two types of cover core must be manufactured, even though they are of the same size, since the position of the rivet hole relative to the caulking tool access hole will differ depending upon the direction of engine rotation.

Accordingly, an object of the present invention is to solve the aforementioned problem encountered in the prior art.

Another object of the present invention is to provide a clutch cover having a cover core which can be used irrespective of the direction of engine rotation.

According to the present invention, the foregoing objects are attained by providing a clutch cover comprising a cover core, a pressure plate enclosed by the cover core, a diaphragm spring arranged between the pressure plate and the cover core for urging the pressure plate, and a strap having one end securely fastened to the cover core by a first rivet and an opposite end securely fastened to the pressure plate by a second rivet. The strap has a rivet hole in the one end for receiving the first rivet and a rivet hole in the other end for receiving the second rivet, the two rivet holes being of equal diameter. The cover core is provided with a first rivet hole for receiving the first rivet and with a caulking tool access hole at a position corresponding to the second rivet, the first rivet hole and the caulking tool access hole being of equal diameter, which is greater than the diameter of the rivet holes in the strap. This arrangement makes it possible to fasten the strap to the cover core at a rivet hole which is on the positive side with respect to the direction of engine rotation, and to position the connection between the strap and the pressure plate at a caulking tool access hole which is on the negative side with respect to the direction of engine rotation.

Though one might conceive of utilizing the art described in the specification of U.S. Pat. No. 3,130,828 to attain the objects of the present invention, this would necessitate a circumferential space (corresponding to the open portion) equivalent to approximately two strap lengths, and the result would be a different problem, namely a decrease in the rigidity of the cover core. With the clutch cover of the present invention, on the other hand, a circumferential space (corresponding to the flat surface portion 17) equivalent to approximately one strap length is sufficient, so there is no decline in cover core rigidity.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of a clutch cover according to the present invention will now be described with reference to the accompanying drawings.

Figure 1:
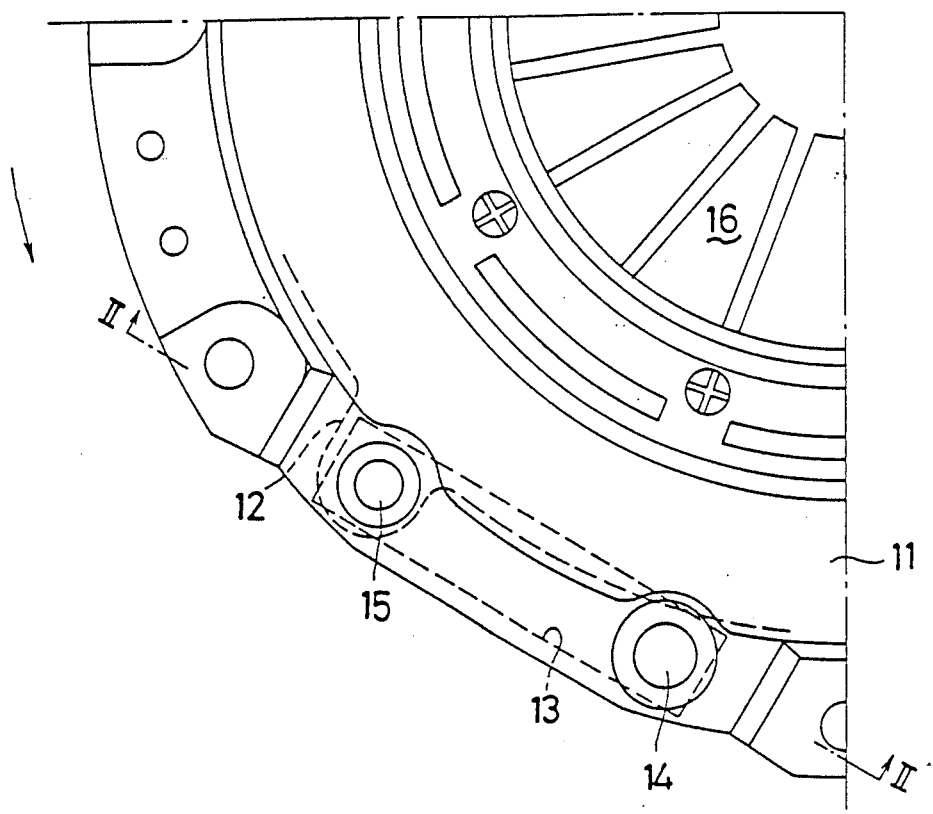
FIG. 1 is a plan view illustrating a preferred embodiment of a clutch cover according to the present invention.
Figure 2:
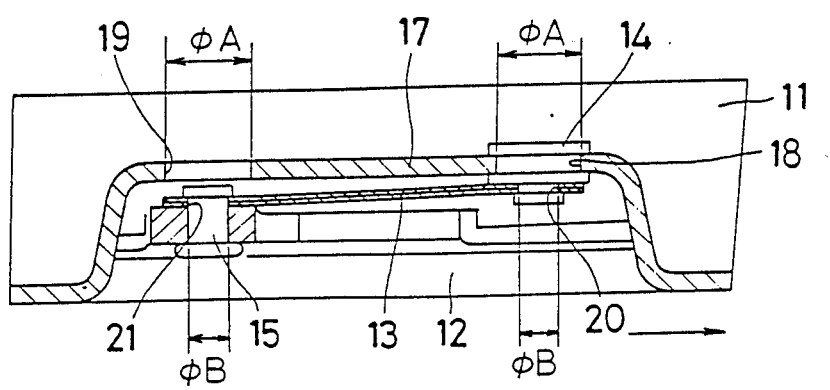
FIG. 2 is a sectional view taken along line II—II of FIG. 1.

In FIGS. 1 and 2, the direction of engine rotation is as illustrated by the arrow. The clutch cover comprises a cover core 11, a pressure plate 12 enclosed by the cover core 11, a diaphragm spring for urging the pressure plate 12, the diaphragm spring having a lever portion 16, and a strap 13 having its one end secured to the pressure plate 12 by a rivet 14 and its other secured to the cover core 11 by a rivet 15 for interconnecting the pressure plate 12 and cover core 11. The cover core 11 has a flat surface 17 at its outer circumference where the core is provided with two holes 18, 19 of equal diameter A. Hole 18, which is on the positive side with respect to the direction of engine rotation, serves as a rivet hole in which the rivet 14 is caulked. One end of the strap 13 is caulked to the distal end of the rivet 14 protruding from the flat surface portion 17 of the cover core 11. The other end of strap 13 is caulked to the pressure plate 12 at the rivet 15. The strap 13 has rivet holes 20, 21 of the same diameter B. The other hole 19 of the cover core 11, which is on the negative side with respect to the direction of engine rotation, is at a position corresponding to the rivet 15. The hole 19 serves as a caulking tool access hole and it is through this hole that the caulking tool is passed to caulk the rivet 15.

Figure 3:
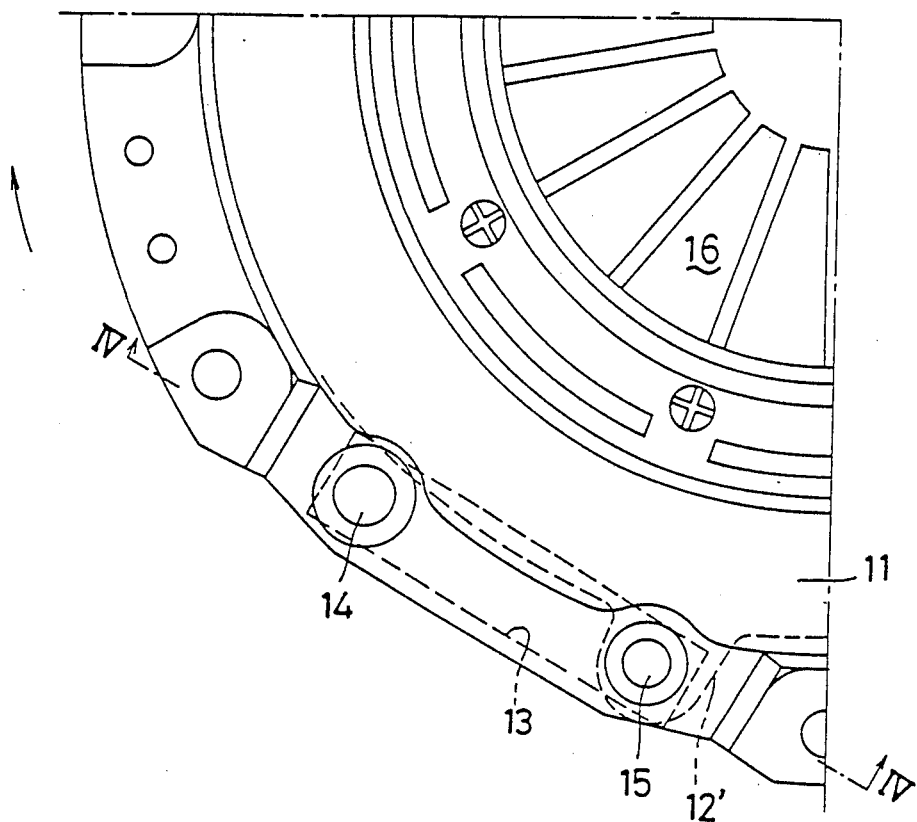
FIG. 3 is a plan view illustrating an embodiment of the present invention for an engine which rotates in a direction opposite to that in FIG. 1.
Figure 4:
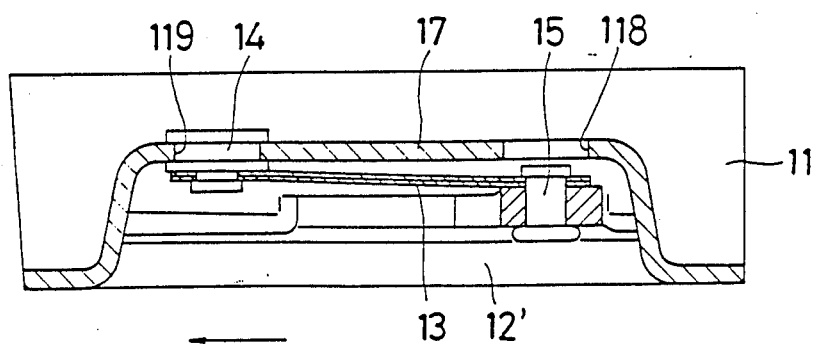
FIG. 4 is a sectional view taken along line IV—IV of FIG. 1.

In FIGS. 3 and 4, the direction of engine rotation is as illustrated by the arrows and is the opposite of that shown in FIGS. 1 and 2. Accordingly, the caulking tool access hole 19 of FIGS. 1 and 2 is here employed as a rivet hole 119 for the rivet 14, and the rivet hole 18 of FIGS. 1 and 2 is employed as a caulking tool access hole 118. In other words, depending upon the direction of engine rotation, the position at which the rivet 14 is installed is so changed that the strap 13 will act in the direction in which the pressure plate 12' is pulled. This enables the same cover core 11 to be used irrespective of the direction in which the engine rotates allowing the strap to act in the direction that it is pulled.

Figure 5:
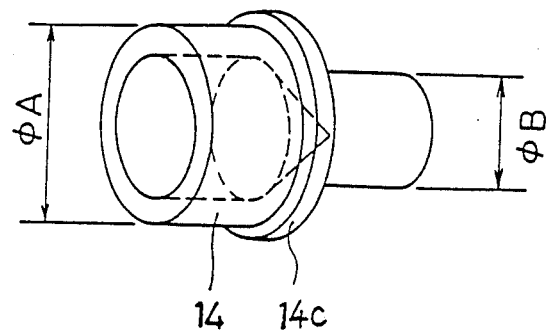
FIG. 5 is a perspective view of a rivet shown in FIG. 1 through 4.

FIG. 5 illustrates an embodiment of the rivet 14 for fastening the strap 13 to the cover core 11. As illustrated, one end of the rivet 14 has the diameter A and the opposite end thereof has the diameter B. Therebetween there is provided a radially protruding flange portion 14c solid with the rivet 14. When installing the rivet 14, first the strap 13 is caulked to the end of rivet 14 having the diameter B, then the end of the rivet 14 having the diameter A is caulked to the cover core 11. Alternatively, the rivet may first be caulked to the cover core 11, after which the strap 13 would be caulked to the rivet.

Figure 6:
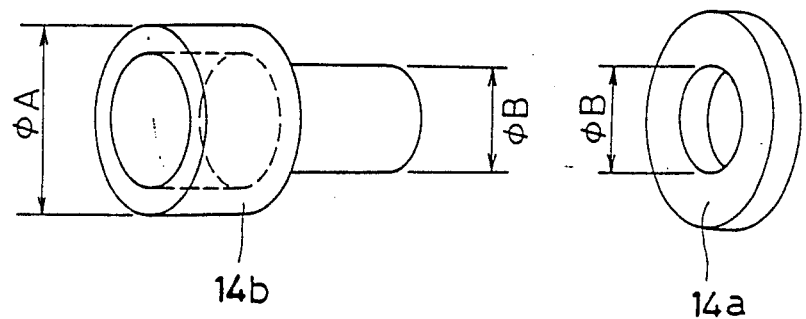
FIG. 6 is a perspective view illustrating a modification of the rivet shown in FIG. 5.

FIG. 6 illustrates a modification of the rivet 14. Here the rivet comprises a caulking shank portion 14b and a separate collar 14a. The collar 14a is fitted on the shank portion 14b between the cover core 11 and strap 13 so as to act like the flange portion 14c of FIG. 5.

As many apparently widely different embodiments of the present invention can be made without departing from the spirit and scope as disclosed herein and defined in the appended claims, it is to be understood that the invention is not limited to the specific embodiments thereof.

What I claim is:

1. A clutch cover comprising:
   a cover core;
   a pressure plate enclosed by said cover core;
   a diaphragm spring arranged between said pressure plate and said cover core for urging said pressure plate; and
   a strap having one end securely fastened to said cover core by a first rivet and an opposite end securely fastened to said pressure plate by a second rivet;
   said strap having a rivet hole in the one end for receiving said first rivet and a rivet hole in the other end for receiving said second rivet, said rivet holes being of equal diameter;
   said cover core being provided with a first rivet hole for receiving the first rivet and with a second hole at a position corresponding to the second rivet, said first rivet hole and said second hole being of equal diameter, which diameter is greater than the diameter of the rivet holes in said strap.

2. The clutch cover as defined in claim 1, wherein the strap is disposed so as to be pulled by the rotation of engine.

3. The clutch cover as defined in claim 1, wherein the first rivet along its length comprises two portions of a large diameter and a small diameter, each corresponding to the first rivet hole in the cover core and the rivet hole in the strap, respectively.

4. The clutch cover as defined in claim 3, wherein the first rivet comprises a radially protruding flange portion between said two portions with large and small diameters.

5. The clutch cover as defined in claim 4, wherein said flange portion is solid with the rivet.

6. The clutch cover as defined in claim 4, wherein said flange portion is a collar to be mounted on the shank portion of the rivet.

7. The clutch cover as defined in claim 1, wherein the first rivet hole and the second hole of the cover core are circular.

8. The clutch cover as defined in claim 2, wherein the second hole of the cover core is adapted to receive a rivet.

9. The clutch cover as defined in claim 1, wherein the distance between the centers of first rivet hole and the second hole of the cover core is equal to the distance between the centers of the two rivet holes in the strap.

* * * * *